United States Patent
Pierre et al.

(10) Patent No.: US 9,530,994 B2
(45) Date of Patent: Dec. 27, 2016

(54) HEAT EXCHANGER FOR TEMPERATURE CONTROL OF VEHICLE BATTERIES

(75) Inventors: Eric D. Pierre, Montcy Notre Dame (FR); Marc Graaf, Krefeld (DE); Florian Wieschollek, Hürth (DE); Felix Girmscheid, Köln (DE)

(73) Assignee: HANON SYSTEMS, Daejeon-Si (KR)

( * ) Notice: Subject to any disclaimer, the term of this patent is extended or adjusted under 35 U.S.C. 154(b) by 1116 days.

(21) Appl. No.: 12/635,303

(22) Filed: Dec. 10, 2009

(65) Prior Publication Data

US 2010/0147488 A1 Jun. 17, 2010

(30) Foreign Application Priority Data

Dec. 15, 2008 (DE) .................. 10 2008 054 680
Sep. 21, 2009 (DE) .................. 10 2009 029 629

(51) Int. Cl.
| | | |
|---|---|---|
| *H01M 2/10* | (2006.01) | |
| *F28D 1/047* | (2006.01) | |
| *F28F 1/02* | (2006.01) | |
| *H01M 10/647* | (2014.01) | |
| *H01M 10/6557* | (2014.01) | |
| *H01M 10/617* | (2014.01) | |
| *H01M 10/613* | (2014.01) | |
| *F28D 21/00* | (2006.01) | |

(Continued)

(52) U.S. Cl.
CPC .......... *H01M 2/1077* (2013.01); *F28D 1/0476* (2013.01); *F28F 1/022* (2013.01); *H01M 10/613* (2015.04); *H01M 10/617* (2015.04); *H01M 10/647* (2015.04); *H01M 10/6557* (2015.04); *F28D 2021/0043* (2013.01); *F28D 2021/0071* (2013.01); *F28F 2280/00* (2013.01); *H01M 10/625* (2015.04); *H01M 10/6567* (2015.04); *H01M 10/6569* (2015.04)

(58) Field of Classification Search
CPC .......... F28D 11/04; F28D 9/04; F28D 1/0476; F28F 9/001; F28F 9/0241; F28F 1/22; F28F 1/022; H01M 2/1077; H01M 10/613; H01M 10/617; H01M 10/676; H01M 10/6557
USPC ... 165/46, 47, 86, 81–83, 164, 170, 10, 150; 429/120, 156, 62
See application file for complete search history.

(56) References Cited

U.S. PATENT DOCUMENTS 2,091,584 A * 8/1937 Brown .......................... 165/171
2,936,741 A * 5/1960 Telkes ............................. 165/10
(Continued)

FOREIGN PATENT DOCUMENTS

DE 195 29 880 A1 2/1997
DE 197 30 678 A1 1/1999
(Continued)

*Primary Examiner* — Tho V Duong
*Assistant Examiner* — Raheena Rehman
(74) *Attorney, Agent, or Firm* — Fraser Clemens Martin & Miller LLC; James D. Miller

(57) ABSTRACT

The invention relates to a heat exchanger for temperature controlling and fastening of battery units of the battery of a vehicle. The heat exchanger includes flat tubes that are passable by a heat carrier and a collecting tube and distributing tube for conducting the heat carrier. The flat tubes are established as multi-channel flat tubes. The collecting tube and the distributing tube are connected to each other over the flat tubes so that a holding frame is established that provides a structure forming spaces. The spaces are provided as chambers for accommodating the battery units.

16 Claims, 3 Drawing Sheets

(51) Int. Cl.
*H01M 10/625* (2014.01)
*H01M 10/6569* (2014.01)
*H01M 10/6567* (2014.01)

(56) References Cited

U.S. PATENT DOCUMENTS

| | | | | |
|---|---|---|---|---|
| 3,006,979 | A | * | 10/1961 | Rich .................... 165/80.2 |
| 3,360,032 | A | * | 12/1967 | Sherwood ................ 165/299 |
| 4,570,700 | A | * | 2/1986 | Ohara et al. ............... 165/170 |
| 5,593,793 | A | * | 1/1997 | German .................... 429/62 |
| 5,871,859 | A | | 2/1999 | Parise |
| 6,106,972 | A | | 8/2000 | Kokubo et al. |
| 6,138,466 | A | | 10/2000 | Lake et al. |
| 6,296,968 | B1 | | 10/2001 | Verhoog |
| 6,326,103 | B1 | * | 12/2001 | Ido et al. .................. 429/148 |
| 6,422,027 | B1 | | 7/2002 | Coates, Jr. et al. |
| 6,444,353 | B1 | * | 9/2002 | Takaki et al. ............. 429/120 |
| 6,512,347 | B1 | | 1/2003 | Hellmann et al. |
| 6,575,258 | B1 | | 6/2003 | Clemmer |
| 6,653,002 | B1 | | 11/2003 | Parise |
| 6,892,803 | B2 | * | 5/2005 | Memory et al. ........... 165/150 |
| 7,000,681 | B2 | * | 2/2006 | Lang et al. ................ 165/10 |
| 7,291,420 | B2 | * | 11/2007 | Bitsche et al. ............ 429/120 |
| 7,323,272 | B2 | * | 1/2008 | Ambrosio et al. .......... 429/120 |
| 7,450,388 | B2 | | 11/2008 | Beihoff et al. |
| 2001/0040061 | A1 | | 11/2001 | Matuda et al. |
| 2002/0043413 | A1 | | 4/2002 | Kimishima et al. |
| 2002/0195237 | A1 | | 12/2002 | Luz et al. |
| 2004/0111308 | A1 | | 6/2004 | Yakov |
| 2004/0232891 | A1 | | 11/2004 | Kimoto et al. |
| 2005/0026014 | A1 | | 2/2005 | Fogaing et al. |
| 2005/0170240 | A1 | * | 8/2005 | German et al. ............. 429/120 |
| 2005/0170241 | A1 | * | 8/2005 | German et al. ............. 429/120 |
| 2006/0092611 | A1 | | 5/2006 | Beihoff et al. |
| 2007/0231678 | A1 | | 10/2007 | Park et al. |
| 2007/0248876 | A1 | | 10/2007 | Ahn et al. |
| 2008/0292945 | A1 | | 11/2008 | Kumar et al. |
| 2009/0075158 | A1 | | 3/2009 | Rudorff et al. |
| 2009/0301700 | A1 | * | 12/2009 | German et al. ............. 165/160 |

FOREIGN PATENT DOCUMENTS

| | | |
|---|---|---|
| DE | 198 49 491 C1 | 1/2000 |
| DE | 100 34 134 A1 | 1/2002 |
| DE | 102 20 775 A1 | 11/2003 |
| DE | 102 23 782 A1 | 12/2003 |
| DE | 102 38 235 A1 | 3/2004 |
| DE | 10 2004 021 280 B3 | 6/2005 |
| DE | 102004005394 A1 | 8/2005 |
| DE | 10 2004 035 879 A1 | 2/2006 |
| DE | 10 2006 004 419 A1 | 8/2006 |
| DE | 60213474 T2 | 3/2007 |
| DE | 10 2005 047 653 A1 | 4/2007 |
| DE | 10 2006 015 568 B3 | 5/2007 |
| DE | 10 2006 000 885 B3 | 8/2007 |
| DE | 10 2007 012 893 A1 | 3/2008 |
| DE | 10 2006 047 926 A1 | 4/2008 |
| DE | 10 2007 004 979 A1 | 8/2008 |
| DE | 10 2007 044 461 A1 | 3/2009 |
| DE | 10 2007 050 400 A1 | 4/2009 |
| DE | 102008032086 A1 | 1/2010 |
| EP | 0 880 190 A2 | 11/1998 |
| EP | 1 264 715 A2 | 3/2002 |
| EP | 1 278 263 A2 | 1/2003 |
| EP | 1 302 731 A1 | 4/2003 |
| EP | 1 637 709 A2 | 3/2006 |
| EP | 1 961 601 A2 | 8/2008 |
| JP | 197684041 A | 7/1976 |
| JP | 08148187 A * | 6/1996 |
| JP | 2000046441 A * | 2/2000 |
| JP | 2000048867 A * | 2/2000 |
| JP | 2000307139 A | 11/2000 |
| WO | WO 03/001313 | 1/2003 |
| WO | WO 03/007402 A1 | 1/2003 |
| WO | WO 03/015192 A2 | 2/2003 |
| WO | WO 03/023892 A1 | 3/2003 |
| WO | WO 03/031884 A2 | 4/2003 |
| WO | WO 2008/044446 A1 | 4/2008 |
| WO | WO 2008/062298 A1 | 5/2008 |
| WO | WO 2008/078586 A1 | 7/2008 |
| WO | WO 2008/081298 A1 | 7/2008 |
| WO | WO 2008/090939 A1 | 7/2008 |
| WO | WO 2009/004928 A1 | 1/2009 |

* cited by examiner

HEAT EXCHANGER FOR TEMPERATURE CONTROL OF VEHICLE BATTERIES

CROSS-REFERENCE TO RELATED APPLICATION

This application claims priority to German Patent Application No. DE 10 2008 054 680.1 filed Dec. 15, 2008 and German Patent Application No. DE 10 2009 029 629.8 filed Sep. 21, 2009, the entire disclosures of which are hereby incorporated herein by reference.

FIELD OF THE INVENTION

The invention relates to a heat exchanger for temperature control and fastening of battery units in a vehicle, especially a hybrid or electric vehicle.

BACKGROUND OF THE INVENTION

The high-capacity batteries used in electric or hybrid vehicles serve to store electric energy. In an electric vehicle, the battery is supplied with energy by connecting it to a power source. In hybrid vehicles, energy can additionally be recovered during braking of the vehicle.

In operation, that is on charging or decharging, or when the stored energy is taken from the battery, heat is released. Batteries possess an optimal operating temperature so that the developed heat must be eliminated, since an increased operating temperature causes a very heavy thermal load of the battery cells and electronic components. In addition, very high demands must be satisfied in relation to a low temperature spread between the individual battery cells.

Cooling the battery, that is to be seen as heat source, extends its life and should be carried out such that the temperatures of the cooled battery vary only within a limited range, and the temperature spread between individual battery cells is as small as possible.

A cooling device for the battery cannot be integrated into the engine cooling system of a hybrid vehicle due to too high temperatures of up to about 100° C. within the engine cooling system. The highest temperatures within the battery, dependent on the battery type, should be 40° C. to 60° C. maximum. Therefore it is necessary to use an additional cooling device.

It is known to cool batteries in electric or hybrid vehicles by use of the ambient air. But on a hot summer day, the temperature of the outside air can reach, or even exceed, 40° C., so that cooling based on unprepared ambient or outside air is not possible. On the one hand, it is conceivable to reduce the battery output at these outside conditions in order to limit the developed heat. But the disadvantage arises that the battery cannot provide its maximum output.

On the other hand, it is possible to take the cooling air either from the ambience or the air-conditioned passenger compartment and pass the air through the battery after having the air cooled by the air-conditioning unit of the vehicle.

Use of cooling air taken from the inside of the passenger compartment enables a narrower temperature range compared with the use of ambient air, but taking air from the passenger compartment increases the noise in the vehicle, hence reducing the passengers' comfort.

And when the batteries are air-cooled, a very high temperature spread between the individual battery cells as well may develop. To reduce the temperature spread, a very large air mass flow rate must be used for cooling. Further, when an air-based cooling system is used, in addition to the aforementioned loud flow-borne noise and the cooling output being dependent on the ambient conditions, large space requirements for air ducting and the necessary fans are extremely disadvantageous.

In addition to cooling the battery using air cooled by the air conditioning unit of the vehicle, other methods are known to link the battery cooling system to the air conditioning system of the vehicle. First, it is possible to directly cool the battery using the refrigerant, and second, by use of a secondary circuit of the air conditioning unit. In direct cooling, the heat exchanger is supplied with refrigerant to absorb the heat that develops within the battery. When cooling is based on a secondary circuit, the heat that is absorbed in the heat exchanger of the battery could be dissipated in a second heat exchanger to the air conditioning unit of the vehicle. Water or glycol, for example, could function as circulating heat carrier.

In DE 10 2006 004 419 A1, a cooling design is proposed that is provided with a cooling water circuit for cooling the heat-generating components. The cooling water circuit is connected to the engine cooling water circuit, for example, of a hybrid vehicle. The closed water circuit and a refrigerant circuit of the air conditioning unit of the vehicle are thermally coupled over a water/refrigerant heat exchanger. The heat absorbed in the water circuit as secondary circuit is transferred to the refrigerant circuit in the water/refrigerant heat exchanger.

From DE 10 2006 004 419 A1, a heat exchanger for absorbing the heat developed within the battery is known, where the plate-like heat-generating elements in a plate thickness direction are arranged such that predetermined distances between said elements are established as fluid channels. The heat-generating elements are firmly integrated into the heat exchanger that due to the wide flow cross-sections on the heat carrier side with external dimensions has a disadvantageously very large installation space. Owing to the transfer of sensible heat, additionally, dependent on the heat output to be eliminated a large mass flow of the heat carrier is necessary.

Other different devices and systems are proposed in prior art as heat exchangers for absorbing the heat developed within the battery.

In DE 198 49 491 C1, an electrochemical energy storage is disclosed that comprises a heat exchanger structure for temperature control of the storage cells. The heat exchanger structure is provided with two advance channels positioned on opposite sides of the storage cell arrangement and two return channels each corresponding on the opposite side. The accompanying parallel arranged channels are passed in opposite directions. The heat exchanger channels that are established as pipe elements with rectangular cross-sections also function to support the storage cells. The shape ensures good area contact between the channels and the rectangular storage cells. As tempering medium particularly, air, water or a similar liquid refrigerant is used.

From DE 10 2007 044 461 A1, a heat exchanger unit, that is established as waveguide cooler, for an electrochemical energy storage is known, which is provided with flow channels passable by a tempering medium. The channels are provided at their ends with feeding or collecting, respectively, advance distributing channels or return collecting channels that are arranged opposite to each other and with their flow cross-sections established rectangular. For an improved adaptation to circular storage cells, the flow channels are designed wave-shaped in direction of flow. A gaseous medium such as air or a liquid medium such as water is used as tempering medium.

The heat exchangers of the prior art are for cooling storage cells of a battery, especially a vehicle battery, owing to their operation mode based on air or water have wide flow cross-sections on the heat carrier side. Therefore, a disadvantageously large installation space of the heat exchanger, and hence, of the storage device is required. Owing to the transfer of sensible heat, a very large mass flow of the heat carrier is necessary as well, dependent on the heat output to be eliminated. The temperature increases in flow direction of the heat carrier within the heat exchanger so that no homogeneous temperature distribution within the storage cells can be ensured. Wide temperature spreads between the individual battery or storage cells, on the other hand, have a negative effect on the cell life.

SUMMARY OF THE INVENTION

This invention aims at realizing a compact heat exchanger unit for the temperature control of a battery consisting of storage cells in a motor vehicle, especially a hybrid or electric vehicle, the heat exchanger unit requiring minimum installation space while providing a high cooling output and ensuring a very homogeneous temperature distribution within the battery while generating minimum noise. The assembly effort when installing said unit in the vehicle is to be minimized as well.

The invention solves the problem by a heat exchanger that is provided for temperature control and fastening of electrochemical energy storages. In the following, the electrochemical energy storages are referred to as battery units. Such an electrochemical energy storage can particularly be Ni/MeH- or Li-ion cells. Several cells are connected to form a battery unit while several battery units in common form the battery.

The heat exchanger according to the invention comprises flat tubes that are passable by a heat carrier and collecting and distributing tubes for conducting the heat carrier. The flat tubes are advantageously established as multi-channel flat tubes. The collecting tubes, distributing tubes and flat tubes in combination form a vertically oriented holding frame that in its structure forms spaces. The rectangular spaces are provided as chambers for directly accepting the battery units. The heat carrier absorbing or giving off the heat is passed through the flat tubes that are arranged between the battery units. In the horizontal plane, the chambers are designed closed at the bottom and open upwards. Alternatively, the chambers can also be designed open at the bottom. The openings in the vertical direction make possible to insert, or assemble, respectively, the battery units within the heat exchanger which forms the spaces.

Due to the use of the multi-channel flat tubes in connection with the collecting and distributing tubes, a very compact heat exchanger unit requiring minimum installation space is advantageously realized.

The concept of the invention is that the holding frame that owing to the tubes is designed as a one-piece structure has chambers with a rectangular cross-section that are characterized by longitudinal sides and narrow sides. The heat exchanger according to the invention forms a functional unit consisting of holding frame for positioning and fixing the battery units in the vehicle and heat exchanger for dissipating heat losses to reach the optimal working temperature of the battery units. The combination leads to reduced place and installation space, while providing optimal conditions of heat transfer. The chambers as intermediate spaces of the holding frame are oriented aligned to each other in line, that is, the chambers are positioned adjacent to each other in a spatial direction of the horizontal plane. In an advantageous embodiment of the invention, several rows of chambers are positioned adjacent to each other in the second spatial direction of the horizontal plane.

The walls of the spaces, according to the concept of the invention, are established from multi-channel flat tubes with the flat tubes being arranged horizontal, parallel, and with their narrow sides pointing to each other. The wide sides of the flat tubes each form the vertical walls of the chambers, that is, the wide sides each are arranged in vertical planes.

In an advantageous embodiment of the invention, the collecting tube and the distributing tube are arranged vertical. The connections for discharging the heat carrier from the collecting tube and for charging the heat carrier into the distributing tube each are provided at the lower tube end.

The chambers of the heat exchanger established as holding frame are designed closed at their perimeters. Thus, the heat exchanger encloses the battery units, which are placed in the chambers, on their complete perimeters. The heat carrier flows along all four vertical sides of the battery units and can dissipate the heat generated in the units.

In a particularly advantageous embodiment of the invention, different multi-channel flat tubes have different flow cross-sections, whereas the external dimensions and geometries of the flat tubes are equal. Therefore, heat exchangers that are equal in their external shapes, or design, and external dimensions can be used with the flow cross-sections in the interior of the multi-channel flat tubes adapted to the respective heat carrier. Thus, it is made possible that battery units that are identical in shape, dimensions and arrangements can be temperature-controlled by use of systems with heat exchangers that are operated with different heat carriers.

In an alternative embodiment, the heat exchanger is established to comprise multi-channel flat tubes with different flow cross-sections while having equal external geometries and dimensions. So the heat exchanger can optionally be operated with different heat carriers, hence being convertible to another heat carrier without adapting other components within the battery units. The internal partitions and the connecting pieces of the collecting and distributing tubes are matched to the internal flow cross-sections, which are adjusted to the heat carrier properties. The multi-channel flat tubes are passable in their vertical arrangement preferably alternately by the different heat carriers. If, for example, a heat exchanger is designed for two different heat carriers I and II, the multi-channel flat tubes loaded with the heat carrier I are located directly adjacent to the multi-channel flat tubes loaded with the heat carrier II. Since the heat exchanger is passed either by the heat carrier I or the heat carrier II, the respective other flat tubes are not loaded, functioning only as supporting and heat conducting component for the battery units and walls of the heat exchanger.

Further, the walls are advantageously established by heat conducting sheets. The multi-channel flat tubes are mechanically and heat-conductively connected to each other in vertical direction on the longitudinal sides of the chambers. Heat conduction between the multi-channel flat tubes ensures to homogenize the temperature on the surface of the heat exchanger.

The chambers that accommodate the battery units are segmented by the heat conducting sheets. The inner surfaces of the chambers are formed by the heat conducting sheets and are even and smooth so that the battery units can easily be mounted in the spaces, or chambers, of the heat exchanger. So the heat conducting sheets serve to not only connect the flat tubes to each other in a heat-conducting manner, but also provide contact areas for heat transfer with the battery units.

Preferably, the heat conducting sheets are soldered, brazed, bonded or clamped to the multi-channel flat tubes.

In another embodiment of the invention, the multi-channel flat tubes are deformable on the narrow sides of the chambers, that is, the narrow sides of the chambers are alterable in their lengths. Hence, the chambers are advantageously flexibly formable in the horizontal spatial directions. The formability enables the battery units to be mounted more easily in the inside of the chambers by bending. Subsequent pressing ensures good heat transfer between the heat exchanger and the battery units. Furthermore, formability provides the specific advantage that spatial expansions of the battery units due to thermal loads during operation can be balanced.

Alternatively, the multi-channel flat tubes, based on the rectangular arrangement opposite to the longitudinal sides of the chambers, are deformed to be arched outwardly in longitudinal direction of the chambers. The archs, or deformations, respectively, of the multi-channel flat tubes in longitudinal direction of the chambers cause the narrow sides to shorten and the longitudinal sides of the chambers to approach each other. The deformability of the flat tubes in the horizontal spatial directions has the aforementioned advantage that assembly of the battery units is easier and spatial expansions of the battery units due to thermal loads during operation are balanced.

In another embodiment, the heat exchanger according to the invention is established as refrigerant evaporator. The direct refrigerant cooling advantageously enables to realize a very compact unit of a battery, or battery units, and a heat exchanger for the temperature control of the battery units. The direct refrigerant cooling has the additional advantage that the heat exchanger can be directly connected to the refrigerant circuit of the vehicle's air conditioning unit.

When a refrigerant is evaporated, a highly homogeneous temperature distribution is achieved because of the almost constant temperature on evaporation.

Examples of refrigerants which can be used as phase-changing heat carriers are carbon dioxide (R744), R134a or HFO1234yf. But the heat exchanger is also operatable with a liquid one-phase refrigerant such as glycol. The flow cross-sections of the multi-channel flat tubes have to be dimensioned dependent on the heat carrier used.

Since the flat tubes are in direct contact to the battery units, the heat to be dissipated is led from the battery units into the refrigerant or the heat carrier.

According to the concept of the invention, the collecting tube and the distributing tube, which are connected to each other over the multi-channel flat tubes, are established such that the mass flow of the heat carrier is dividable into partial flows among the multi-channel flat tubes. All partial flows pass through the multi-channel flat tubes parallel in one direction.

Alternatively, the mass flow of the heat carrier is dividable into partial flows among the multi-channel flat tubes with the partial flows passing the multi-channel flat tubes preferably parallel in one direction and after redirection in the collecting tube and/or distributing tube passing adjacent multi-channel flat tubes in countercurrent.

The selectable division and direction of the refrigerant mass flow in countercurrent has the advantage that a highly heated multi-channel flat tube is positioned adjoining a flat tube that is passed by heat carrier in entry condition, that is at a considerably lower temperature, so that the temperature can be better homogenized within the battery units.

In another embodiment of the invention, bracing frames with bracing struts for bracing the battery units are provided within the chambers of the heat exchanger. This ensures a sufficient heat transfer between the battery units and the walls of the chambers of the heat exchanger, particularly the heat conducting sheets. The bracing struts, which are passed between the battery units, are advantageously established such that on bracing, said struts are stretched in a defined manner so that they ensure a specific bracing tension in order to brace the side walls of the bracing frames, hence the walls of the chambers of the heat exchanger. By means of the bracing, the contact force necessary for the required heat conduction is maintained when dimensions of the battery units change. Dependent on tensile strength and cross-section the bracing struts are dimensioned such that a minimum bracing tension is ensured at all operating conditions and a maximum bracing tension will not be exceeded. Alternatively, the bracing struts can also be dimensioned larger so that at any operating condition no significant stretch of the bracing struts will occur. In case of larger dimensioning of the bracing struts, resilient components are provided for prestressing the bracing frame.

In an alternative embodiment, the tensile forces are applied by means of the bracing frame. When assembling the bracing frame with bracing struts the not stretchable bracing struts are fastened and the tensile forces transmitted to the bracing frame. In this case, the prestressing is ensured over the bracing frame that is established stretchable. On assembly shortening of the bracing struts deforms the bracing frame in a defined way so that the side walls of the bracing frames, or the walls of the chambers of the heat exchanger, respectively, are braced.

The bracing frames and the bracing struts can be established of metal or plastics.

The description relates to the upright design of the heat exchanger, where the chambers are opened upward, that is in vertical direction. Alternatively, the heat exchanger can also be designed to be lying. In the lying design the chambers are opened to the sides, that is in horizontal direction. The terms horizontal and vertical essentially refer to the following explanations of the figures. The terms horizontal and vertical merely indicate a relative direction and are not used in a limiting way.

Summarizing, the relevant advantage of the heat exchanger is its compactness, that is large cooling output combined with minimum installation space. Further advantages of the heat exchanger over prior art sum up as follows:
- minimum noise emission;
- minimum assembly effort due to assembly clearance provided;
- very homogeneous temperature distribution due to good heat transfer;
- homogenized temperature on the surface of the heat exchanger due to heat conducting sheets;
- flow cross-sections of the multi-channel flat tubes adapted to the respective heat carrier with equal external dimensions and geometries of the flat tubes;
- flexible deformability in horizontal spatial directions so that spatial expansions due to thermal loads are compensatable; and
- establishment as refrigerant evaporator with direct connection to the refrigerant circuit of the vehicle's air conditioning unit.

BRIEF DESCRIPTION OF THE DRAWINGS

The above, as well as other advantages of the present invention, will become readily apparent to those skilled in the art from the following detailed description of a preferred embodiment when considered in the light of the accompanying drawings in which.

DETAILED DESCRIPTION OF EXEMPLARY EMBODIMENTS OF THE INVENTION

The following detailed description and appended drawings describe and illustrate various exemplary embodiments of the invention. The description and drawings serve to enable one skilled in the art to make and use the invention, and are not intended to limit the scope of the invention in any manner. It is understood that materials other than those described can be used without departing from the scope and spirit of the invention. In respect of the methods disclosed, the steps presented are exemplary in nature, and thus, the order of the steps is not necessary or critical.

Figure 1:
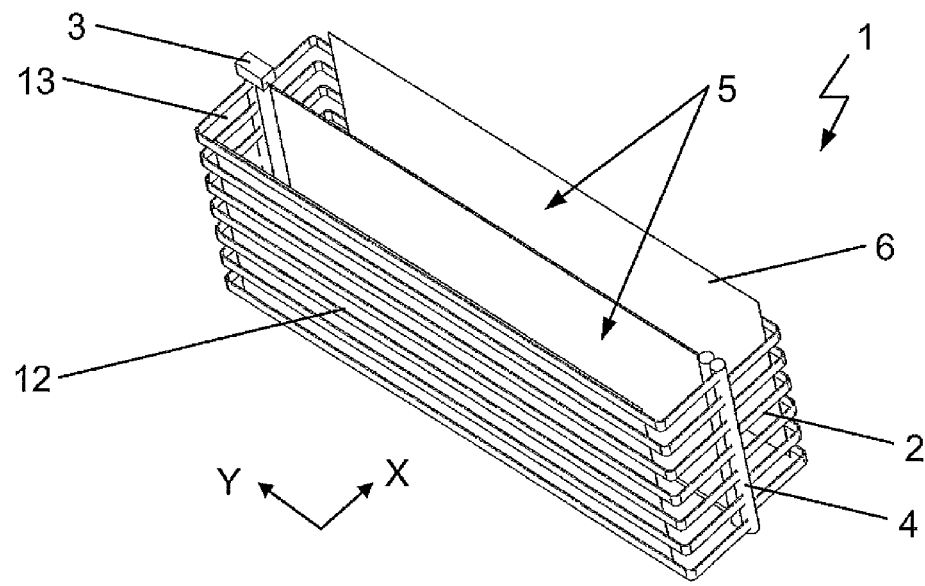
FIG. 1: heat exchanger with chambers for accommodating battery units.

In FIG. 1, the heat exchanger (1) according to the invention with chambers (5) for accommodating battery units is shown, the battery units being cooled by means of the heat exchanger (1). The heat exchanger (1) passed by a heat carrier dissipates the heat that develops during operation of the battery units, that means, during charging and discharging, such ensuring that the battery does not exceed a defined maximum temperature, in order to prolong the longevity of the battery.

The heat carrier that dissipates the heat from the battery flows through the flat tubes (2) that are arranged around the battery units so that the heat absorbing medium is directly passed between the adjacently arranged battery units. The multi-channel flat tubes (2) are connected to each other. A distributing tube (4) is provided for distributing the heat carrier into the individual cross-sections of the multi-channel flat tubes (2), a collecting tube (3) is provided for combining the individual channels. Dependent on the desired division and redirection of the heat carrier within the heat exchanger (1), or the multi-channel flat tubes (2), respectively, the inner volumes of the distributing tube (4) and/or the collecting tube (3) are provided with divided sections or established as connected region. The multi-channel flat tubes (2) are oriented horizontal, the collecting tube (3) and the distributing tube (4) are oriented vertical. The connections for discharging the heat carrier from the collecting tube (3) and for charging the heat carrier into the distributing tube (4) each are provided at the lower tube end. Advantageously, from the thermodynamic point of view, the connection at the collecting tube (3) can also be positioned at the upper tube end.

The heat exchanger (1) can be operated with a phase-changing medium, for example, the refrigerant of the refrigerant circuit of the vehicle's air conditioning unit, or a one-phase fluid, for example glycol. As the battery cooler is also provided to be operated at outside temperatures below 0° C., where the air conditioning unit of the vehicle may not be switched on for air conditioning of the passenger compartment, oil return from the heat exchanger (1) has to be ensured, so-called oil traps avoided. The vertical orientation of the collecting tube (3) and distributing tube (4) with connections located at the bottom, that particularly serves to ensure the necessary oil transport at all operational conditions, guarantees that no oil-storing "reservoirs" develop.

The walls of the chambers (5), that are established rectangular for accepting the battery units, in their combination are arranged as a grid-like structure so that the battery units are adjacent to each other in the horizontal spatial directions (X, Y). The multi-channel flat tubes (2) that each have longitudinal sides (12) and narrow sides (13) completely enclose a chamber (5) so that the heat is dissipated from the vertical sides of each battery unit.

For improved heat conduction, hence distribution of the dissipated heat, the adjacent multi-channel flat tubes (2) at the longitudinal sides (12) of the chambers (5) are connected to each other by heat conducting sheets (6). The heat conducting sheets (6) are connected to the multi-channel flat tubes (2) by material or form closure. The heat conducting sheets (6) are bonded or clamped onto the multi-channel flat tubes (2). In this case, the multi-channel flat tubes (2) with the collecting tubes (3) and distributing tubes (4), usually also referred to as tanks, brazed by inductive methods, which advantageously reduces the brazing time required. But the heat conducting sheets (6) can also be brazed to the multi-channel flat tubes (2). Then the whole heat exchanger (1), comprising collecting tubes (3), distributing tubes (4), multi-channel flat tubes (2) and heat conducting sheets (6), is brazed in a brazing furnace as preassembled unit with the according short cycle periods.

Since the heat conducting sheets (6) are made of a very good heat conductor such as copper or aluminum, the temperatures on the outside of the battery units are very well homogenized. Temperature differences, possibly developing due to processes within the battery units, are well balanced. The heat conducting sheets (6) attached to the multi-channel flat tubes (2) enable the heat flow between the individual multi-channel flat tubes (2). A multi-channel flat tube (2) that is passed by the heat carrier at a lower temperature absorbs a larger heat flow than a flat tube (2) that is passed by a warmer heat carrier. Thus, the heat conduction between the flat tubes (2) provides to homogenize the temperature at the surface of the battery units or the heat exchanger (1). If, for example, the temperature in a flat tube (2) rises due to local overheating or a highly heated heat carrier, the adjacent battery unit is cooled over heat conducting sheets (6) by the multi-channel flat tube (2) next to this unit.

The direction of the refrigerant mass flow is arbitrary when designing the heat exchanger (1) so that two adjacent multi-channel flat tubes (2) are passed in countercurrent, whereby a flat tube (2) passing the refrigerant, or the cold carrier, respectively, at entry condition, that is at a lower temperature, is located adjacent to a highly heated flat tube (2).

Further, from FIG. 1, it is seen that the vertically oriented heat conducting sheets (6) not only provide for an advantageous thermal connection between the multi-channel flat tubes (2), but also segment the rectangular grid-like arranged chambers (5) for accommodating the battery units. Because of the closure of the spaces between the multi-channel flat tubes (2) and the plane surface of the heat conducting sheets (6), the battery units can easily be mounted in the chambers (5). In addition, the plane surface of the heat conducting sheets (6) enables closed area contact of the heat exchanger surface with the surface of the battery units, which ensures good heat conduction and therefore, efficient tempering of the battery units.

Figure 2:
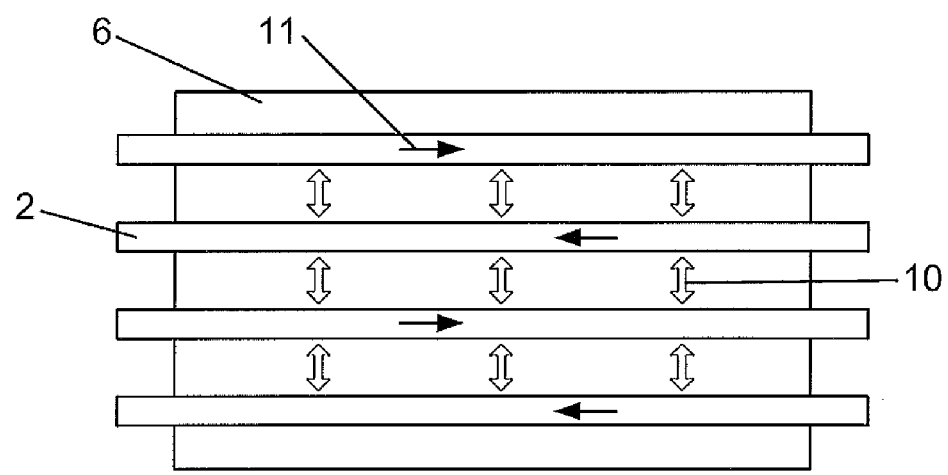
FIG. 2: temperature compensation between the multi-channel flat tubes by heat conduction.

FIG. 2 illustrates the temperature compensation between the multi-channel flat tubes (2) by heat conduction within the heat conducting sheets (6). The multi-channel flat tubes (2) are equally distanced to each other arranged on the heat conducting sheet (6) and thermally coupled to the heat conducting sheet (6) by brazing, soldering, bonding, clamping or in another suitable way. Alternatively, the multi-channel flat tubes (2) can also be arranged having alternating distances, or distances adapted to the available space or other conditions. Heat balance between the multi-channel flat tubes (2) is therefore based on processes of heat conduction. The balancing heat currents then flow essentially in vertical direction (10) between the multi-channel flat tubes (2).

The collecting tube (3) and distributing tube (4) connected over the multi-channel flat tubes (2) are established such that the mass flow of the heat carrier is dividable into partial flows, with one partial flow passing several multi-channel flat tubes (2) parallel in one direction and adjacent multi-channel flat tubes (2) passed in countercurrent.

The mass flow of the heat carrier can, on the other hand, also pass all multi-channel flat tubes (2) after each other in being redirected by collecting tube (3) and distributing tube (4) in such a way that also in this case of application all adjacent multi-channel flat tubes (2) are passed in countercurrent.

In addition, it is possible to homogeneously divide the mass flow of the heat carrier among the multi-channel flat tubes (2) so that the heat carrier does not flow reciprocating several times between distributing tube (4) and collecting tube (3) but co-current flow is realized.

Figure 3A:
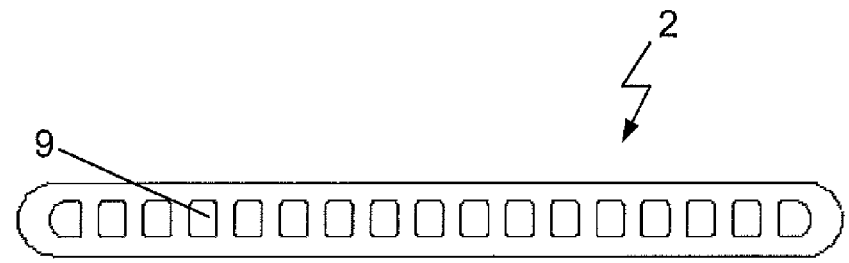
FIG. 3: cross-section of the multi-channel flat tubes with equal external geometries but different flow cross-sections of the channels for different fluids.
Figure 3B:
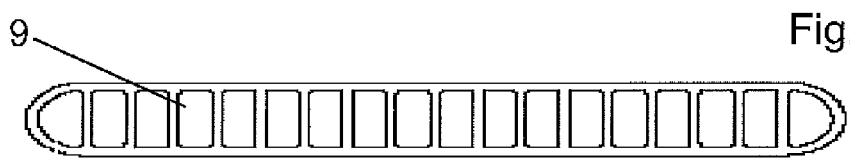

In FIGS. 3a and 3b, cross-sections of multi-channel flat tubes (2) with equal external geometries and different flow cross-sections (9) of the channels are shown. When multi-channel flat tubes (2) with different flow cross-sections (9) but invariable external geometry are used, the heat exchanger (1) is provided to be used with different heat carriers.

When a phase-changing, i.e. evaporating refrigerant is used as heat carrier, the flow cross-sections (9) of the multi-channel flat tubes (2) are adjusted to the pressure loss as permissible in each case. The pressure loss within the flat tube (2) is designed such that the permissible temperature spread of the battery will not be exceeded. The flow cross-section (9) of a flat tube (2) per meter of flow distance and kilowatt of thermal rating is here in the range of 35 $mm^2/$(make) to 55 $mm^2/(m \cdot kW)$. For a one-phase heat carrier such as glycol, the flow cross-sections (9) are to be dimensioned such that a sufficiently large mass flow is passable with the mass flow following from the heat rate to be dissipated and the maximum permissible temperature spread of the battery. Glycol as heat carrier can provide a very narrow temperature spread provided a sufficient mass flow rate is used.

A very homogeneous temperature distribution is particularly achieved when the refrigerant is evaporated within the battery, because the temperature of the refrigerant only depends on the pressure level. In the course of the flow path, the evaporation temperature decreases due to pressure loss. When after the evaporation the refrigerant is overheated at the evaporator outlet the temperature rises again. The pressure losses and overheating are adjusted to the permissible temperature spread of the battery.

The heat exchanger (1) is operatable with different heat carriers by adjusting the inner flow cross-sections (9) while having invariable external geometries, and convertible to another refrigerant or another heat carrier without adjusting other components within the battery. Particularly, the invariable external dimensions of the flow-passing components such as multi-channel flat tubes (2), collecting tube (3) and distributing tube (4) are realizable for the refrigerants R134a, HFO1234yf and R744 and glycol as well. The flow cross-sections (9), however, have to be adjusted to the respective fluid.

Figure 4:
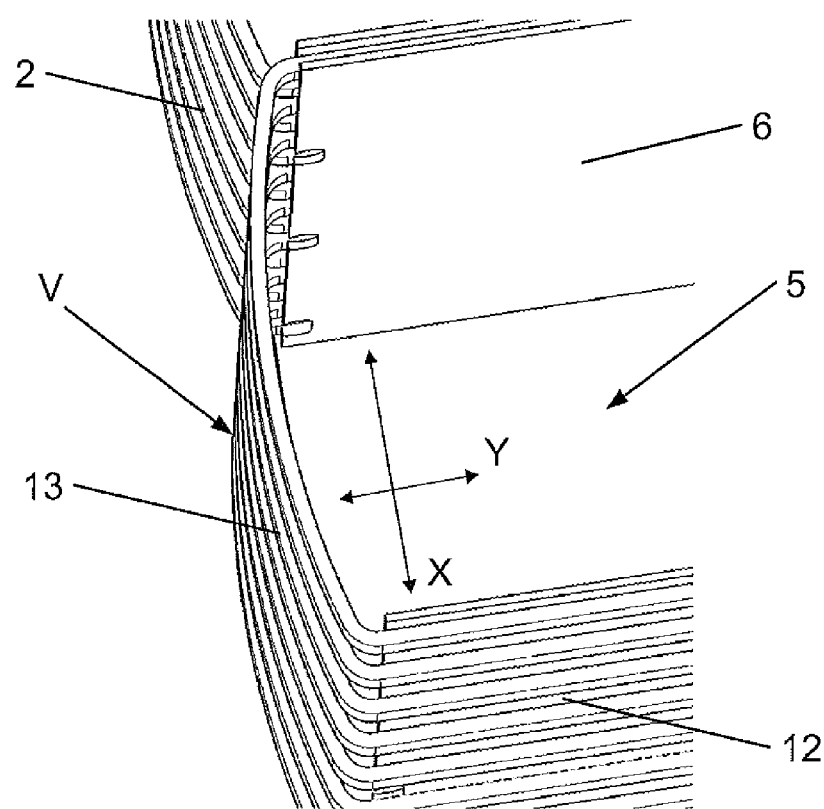
FIG. 4: deformation of the heat exchanger.

FIG. 4 shows a section of a chamber (5) of the heat exchanger (1), where the deformable multi-channel flat tubes (2) arranged on the narrow side (13) are deformed as compound. The webs in the flat tube (2) enable the flat tube (2) to be heavily bent without blocking the flow cross-sections (9). The multi-channel flat tubes (2) are deformable before and/or after brazing.

The flat tubes (2) that compared with the rectangular arrangement are bulged, or in longitudinal direction of the chambers (5) deformed arched outwardly show that the heat exchanger (1) can be designed flexible in the defined spatial directions (X, Y). The higher the value of shortening the narrow side, or the chamber (5), in spatial direction X the more the flat tubes (2) are bulged. Pressing the heat conducting sheets (6) together in horizontal spatial direction X, that is approaching the heat conducting sheets (6) to each other causes decreasing distances between the heat conducting sheets (6) with deformation V of the multi-channel flat tubes (2). Hereby the multi-channel flat tubes (2) are moved outwardly in horizontal spatial direction Y in relation to the chamber (5) and bent at a defined radius. The multi-channel flat tubes (2) can be deformed in the elastic, but also in the plastic range, enabling a flexible formability of the external dimensions of the chambers (5). The variable width of the chamber (5), hence, the variable choice of the external dimensions of the chamber (5) makes possible, on a limited scale, to accommodate battery units with slightly deviating external dimensions while ensuring sufficient contact of the heat conducting sheets (6) to the outer walls of the battery units. Thus, a very good heat transfer between the battery units and the heat exchanger (1) as well as an advantageous clearance for mounting the battery units within the chambers (5) of the heat exchanger (1) is ensured. The chambers (5) of the heat exchanger (1), which are bent up for mounting the battery units—deformation V of the flat tubes (2)—then are pressed together with the battery units to ensure good heat transfer. Bending up of the chambers (5) can be up to 10% of the width of the chamber (5). At a certain adaptation of the inner webs in the flat tube (2), the value of 10% can even be raised.

Furthermore, possible expansions during the operation of the battery units are compensatable while ensuring a sufficient area contact of the heat conducting sheets (6) to the battery units.

Figure 5:
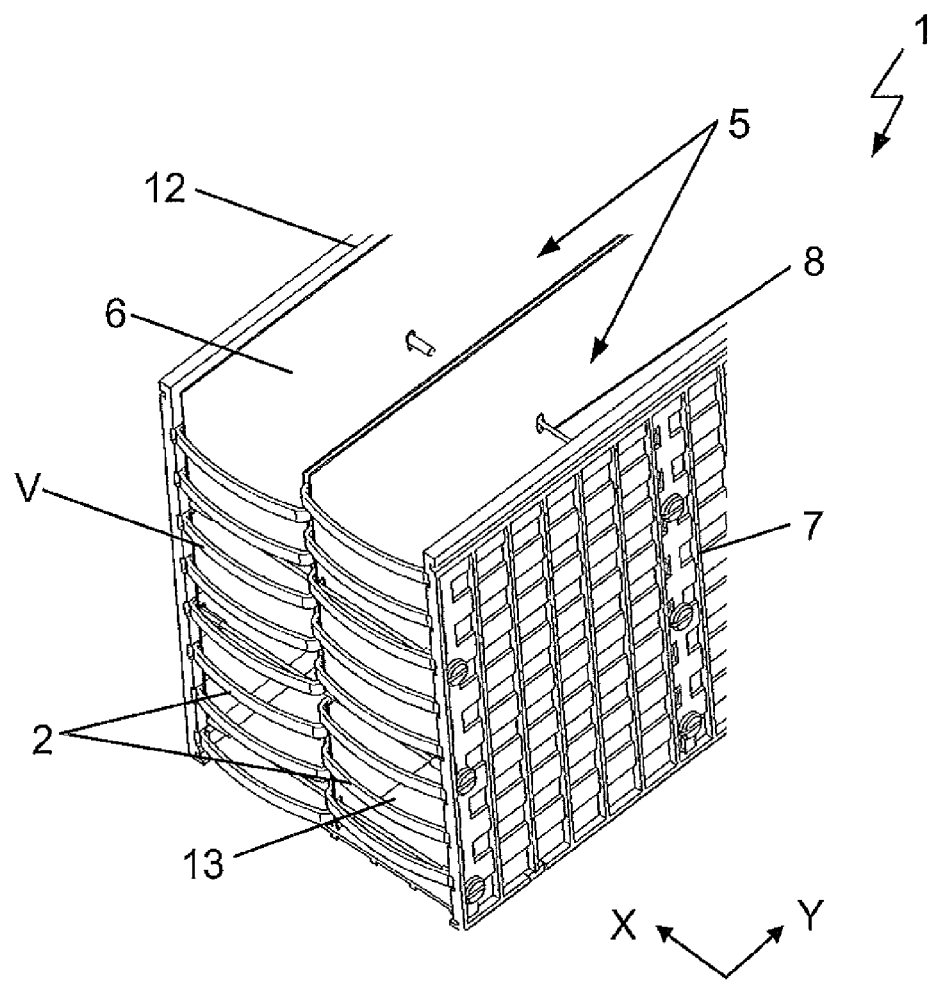
FIG. 5: heat exchanger with bracing frame and bracing struts.

In FIG. 5, the heat exchanger (1) with bracing frame (7) and bracing struts (8) is shown. In order to ensure sufficient heat transfer between the battery units and the heat exchanger (1), the heat exchanger (1) with battery units is braced by means of bracing frame (7) and bracing struts (8) with the bracing struts (8) passed between the battery units. The battery units and the heat exchanger (1) thus form a compound where furthermore, the bracing frame (7) is established to have a bottom closing the chambers (5) downward.

The bracing frame (7) and the bracing struts (8) can be established, for example, to be made of metal or plastics. The bracing struts (8) are dimensioned such that on bracing they are stretched, thus ensuring that the heat exchanger (1) is prestressed. Owing to the prestress also when the dimensions of the cells of the battery units change, the contact force between the surfaces of the battery units and the heat exchanger (1) is maintained. The cross-section and the shape of the bracing struts (8) are dimensioned over the tensile strength in such a way that at all operational conditions, a minimum of bracing is ensured and a maximum of bracing is not exceeded.

Optionally, the bracing struts (8) can also dimensioned to be larger so that no significant stretching of the bracing struts (8) occurs, whereby in this case, the pretension is realized by means of elastic elements such as spring washers.

From the foregoing description, one ordinarily skilled in the art can easily ascertain the essential characteristics of this invention and, without departing from the spirit and scope thereof, can make various changes and modifications to the invention to adapt it to various usages and conditions.

NOMENCLATURE

1 heat exchanger
2 flat tubes/multi-channel flat tubes
3 collecting tube
4 distributing tube
5 chamber
6 heat conducting sheet
7 bracing frame
8 bracing strut
9 flow cross-section
10 direction of the heat flow
11 direction of the mass flow
12 longitudinal side
13 narrow side
V deformation
X, Y horizontal spatial direction

What is claimed is:

1. A heat exchanger for temperature controlling and fastening of battery units of a vehicle, the heat exchanger comprising:
   a plurality of continuously formed first multi-channel flat tubes passable by a heat carrier and forming a holding frame, the holding frame providing a structure that forms a plurality of substantially rectangular chambers for receiving the battery units, the plurality of first multi-channel flat tubes oriented substantially parallel to each other, the plurality of substantially rectangular chambers having narrow sides and longitudinal sides defined by the plurality of first multi-channel flat tubes, wherein the narrow sides of the plurality of substantially rectangular chambers formed by the plurality of first multi-channel flat tubes are arched outwardly causing the narrow sides of the plurality of substantially rectangular chambers to shorten and the longitudinal sides of the plurality of substantially rectangular chambers to approach each other to compensate for expansion of the battery cells due to a thermal load;
   a distributing tube for conducting the heat carrier to a first end of each of the plurality of first multi-channel flat tubes, wherein the distributing tube and the first ends of each of the plurality of first multi-channel flat tubes define a first one of the narrow sides of the plurality of substantially rectangular chambers; and
   a collecting tube for conducting the heat carrier from a second end of each of the plurality of first multi-channel flat tubes, wherein the collecting tube and the distributing tube are connected to each other by the plurality of first multi-channel flat tubes, wherein the collecting tube and the second ends of each of the plurality of first multi-channel flat tubes define a second one of the narrow sides of the plurality of substantially rectangular chambers;
   wherein the plurality of substantially rectangular chambers is disposed between the distributing tube and the collecting tube; and
   wherein an intermediate portion of each of the plurality of first multi-channel flat tubes defines at least one of the longitudinal sides of the plurality of substantially rectangular chambers so the plurality of substantially rectangular chambers is surrounded by the plurality of first multi-channel flat tubes; and
   wherein vertically adjacent ones of the plurality of first multi-channel flat tubes are mechanically and heat-conductively connected to each other by heat conducting sheets in a vertical direction so the plurality of substantially rectangular chambers is segmented for accommodating the battery units by the heat conducting sheets, and wherein each of the heat conducting sheets is oriented substantially vertical.

2. The heat exchanger according to claim 1, wherein the plurality of first multi-channel flat tubes is oriented substantially horizontal to each other, and the collecting tube and the distributing tube are oriented substantially vertical, and wherein the connections for discharging the heat carrier are provided at the collecting tube and for charging the heat carrier are provided at the distributing tube.

3. The heat exchanger according to claim 1, wherein the plurality of first multi-channel flat tubes encloses the battery units located in the plurality of substantially rectangular chambers.

4. The heat exchanger according to claim 1, wherein the collecting tube and the distributing tube are established such that the heat carrier mass flow is dividable into partial flows among the plurality of first multi-channel flat tubes, and wherein all partial flows pass the plurality of first multi-channel flat tubes parallel in one direction.

5. The heat exchanger according to claim 1, wherein the collecting tube and the distributing tube are established such that the heat carrier mass flow is dividable into partial flows among the plurality of first multi-channel flat tubes, and wherein the partial flows pass the plurality of first multi-channel flat tubes parallel in one direction and after redirection in one of the collecting tube and the distributing tube adjacent first multi-channel flat tubes are passed in counter-current.

6. The heat exchanger according to claim 1, further comprising a bracing frame disposed on an outer surface of the plurality of first multi-channel flat tubes and bracing struts disposed in the plurality of substantially rectangular chambers.

7. The heat exchanger according to claim 6, wherein the bracing struts are passed between adjacent battery units and brace side walls of the bracing frame.

8. The heat exchanger according to claim 7, wherein the bracing struts are established such that they are stretched on bracing, hence ensuring a prestress in order to brace the side walls of the bracing frame.

9. The heat exchanger according to claim 1, wherein the narrow sides of the plurality of substantially rectangular chambers are arched outwards in a direction that the longitudinal sides of the plurality of substantially rectangular chambers extend.

10. The heat exchanger according to claim 1, wherein the plurality of first multi-channel flat tubes all have substantially equal external geometries and dimensions and at least one of the first multi-channel flat tubes includes a different interior cross-section for directing flow of the heat carrier therethrough than does an adjacent one of the first multi-channel flat tubes.

11. The heat exchanger according to claim 1, wherein the intermediate portion of each of the plurality of first multi-channel flat tubes defines a pair of opposing longitudinal outer sides of the plurality of substantially rectangular chambers, and wherein the heat exchanger further comprises a plurality of continuously formed second multi-channel flat tubes, the plurality of second multi-channel flat tubes longitudinally formed, wherein the distributing tube and the collecting tube are further connected to each other by the plurality of second multi-channel flat tubes, the plurality of the second multi-channel flat tubes forming an intermediate side of the plurality of substantially rectangular chambers, the intermediate side configured to segment the substantially rectangular chambers.

12. A heat exchanger for temperature controlling and fastening of battery units of a vehicle, the heat exchanger comprising:

a plurality of spaced apart continuously formed multi-channel flat tubes for conducting a heat carrier and forming a holding frame with a plurality of chambers formed therein having a rectangular layout with narrow sides and longitudinal sides defined by the plurality of multi-channel flat tubes for receiving the battery units, wherein the multi-channel flat tubes are oriented substantially parallel to each other, and wherein the narrow sides of the plurality of substantially rectangular chambers formed by the multi-channel flat tubes are arched outwardly causing the narrow sides of the plurality of substantially rectangular chambers to shorten and the longitudinal sides to approach each other to compensate for expansion of the battery cells due to a thermal load, vertically adjacent ones of the plurality of multi-channel flat tubes mechanically and heat-conductively connected to each other by heat conducting sheets, each of the heat conducting sheets oriented substantially vertical;

a distributing tube for conducting the heat carrier to a first end of each of the plurality of multi-channel flat tubes, wherein the distributing tube and the first ends of each of the plurality of multi-channel flat tubes define a first one of the narrow sides of the plurality of substantially rectangular chambers; and a collecting tube for conducting the heat carrier from a second end of each of the plurality of multi-channel flat tubes, wherein the collecting tube and the distributing tube are connected to each other by the plurality of multi-channel flat tubes, and wherein the collecting tube and the second ends of each of the plurality of multi-channel flat tubes define a second one of the narrow sides of the plurality of substantially rectangular chambers;

wherein the plurality of substantially rectangular chambers is disposed between the distributing tube and the collecting tube; and wherein an intermediate portion of each of the plurality of multi-channel flat tubes defines at least one of the longitudinal sides of the plurality of substantially rectangular chambers so the plurality of substantially rectangular chambers is surrounded by the plurality of multi-channel flat tubes.

13. The heat exchanger according to claim 12, further comprising a bracing frame disposed on an outer surface of the plurality of multi-channel flat tubes and bracing struts disposed in the plurality of substantially rectangular chambers.

14. A heat exchanger for temperature controlling and fastening of battery units of a vehicle, the heat exchanger comprising:

a plurality of spaced apart continuously formed multi-channel flat tubes for conducting a heat carrier and forming a holding frame with a plurality of chambers formed therein for receiving the battery units, wherein the holding frame is established such that the chambers have a rectangular layout with longitudinal sides and narrow sides defined by the plurality of multi-channel flat tubes, wherein the multi-channel flat tubes are oriented substantially horizontal and substantially parallel to each other, and wherein the narrow sides of the plurality of substantially rectangular chambers formed by the multi-channel flat tubes are arched outwardly causing the narrow sides of the chambers to shorten and the longitudinal sides to approach each other to compensate for expansion of the battery cells due to a thermal load;

a distributing tube for conducting the heat carrier to a first end of each of the plurality of multi-channel flat tubes, wherein the distributing tube and the first ends of each of the plurality of multi-channel flat tubes define a first one of the narrow sides of the plurality of substantially rectangular chambers; and a collecting tube for conducting the heat carrier from a second end of each of the plurality of multi-channel flat tubes, the collecting tube and the distributing tube connected to each other by the plurality of multi-channel flat tubes, wherein the collecting tube and the second ends of each of the plurality of multi-channel flat tubes define a second one of the narrow sides of the plurality of substantially rectangular chambers, wherein the collecting tube and the distributing tube are oriented substantially vertical, and wherein the connections for discharging the heat carrier are provided at the collecting tube and for charging the heat carrier are provided at the distributing tube;

wherein the plurality of substantially rectangular chambers is disposed between the distributing tube and the collecting tube; and wherein an intermediate portion of each of the plurality of multi-channel flat tubes defines at least one of the longitudinal sides of the plurality of substantially rectangular chambers so the plurality of substantially rectangular chambers is surrounded by the plurality of multi-channel flat tubes; and wherein vertically adjacent ones of the plurality of multi-channel flat tubes are mechanically and heat-conductively connected to each other by heat conducting sheets in a vertical direction so the plurality of substantially rectangular chambers is segmented for accommodating the battery units by the heat conducting sheets, and wherein each of the heat conducting sheets is oriented substantially vertical.

15. The heat exchanger according to claim 14, wherein the plurality of multi-channel flat tubes is mechanically and heat-conductively connected to each other by heat conducting sheets.

16. The heat exchanger according to claim 14, further comprising a bracing frame disposed on an outer surface of the plurality of multi-channel flat tubes and bracing struts disposed in the plurality of substantially rectangular chambers.

\* \* \* \* \*